Aug. 16, 1960 W. E. SARGEANT 2,949,583

TIMING CONTROL CIRCUIT

Filed July 2, 1956

INVENTOR.
Walter E. Sargeant
BY E. W. Christen
ATTORNEY.

United States Patent Office 2,949,583
Patented Aug. 16, 1960

2,949,583

TIMING CONTROL CIRCUIT

Walter E. Sargeant, Huntington Woods, Mich., assignor to General Motors Corporation, Detroit, Mich., a corporation of Delaware Filed July 2, 1956, Ser. No. 595,398

9 Claims. (Cl. 331—114)

This invention relates to control circuits and more particularly to a timing control circuit for a time keeping or measuring instrument.

In many applications, it is desirable to generate a periodic impulse from a direct current source for the control of a timing instrument. A notable example is the automobile clock which is conventionally energized from a storage battery. The control circuits devised heretofore for this purpose commonly employ electrical contacts which are periodically opened and closed. This arrangement is particularly disadvantageous because the relatively short operating life of repetitively operated, current carrying contacts results in premature clock failure.

Accordingly, it is an object of this invention to provide a control circuit for a timing device which may be energized from a direct current source to supply timing impulses of accurately controlled frequency without the use of circuit interrupting contacts.

An additional object of the invention is to provide a timing control circuit in which the frequency of the timing impulses is determined by a pendulum.

A further object of the invention is to provide a control circuit which generates periodic timing impulses of oscillatory voltage in which the impulse repetition rate or recurrence frequency is independent of the frequency of the oscillatory voltage.

A further object of the invention is to provide a timing impulse generating circuit which is especially adapted for automobile clocks and may be energized from a direct current source.

In accordance with this invention, timing impulses are generated at periodic intervals in the output circuit of a feedback oscillator energized from a direct current source. The feedback network of the oscillator includes reactance means which is varied periodically to alternately tune and de-tune the oscillator. The reactance variation is preferably accomplished by an oscillatory mass which is maintained in oscillation at its natural frequency by a driving force derived from energy in the feedback network. The timing impulse is generated in the oscillator output circuit during the interval when the oscillator is tuned and in a state of oscillation.

A more complete understanding of the invention may be had from the detailed description which follows taken with the accompanying drawings in which.

Figures 1, 2, 3:
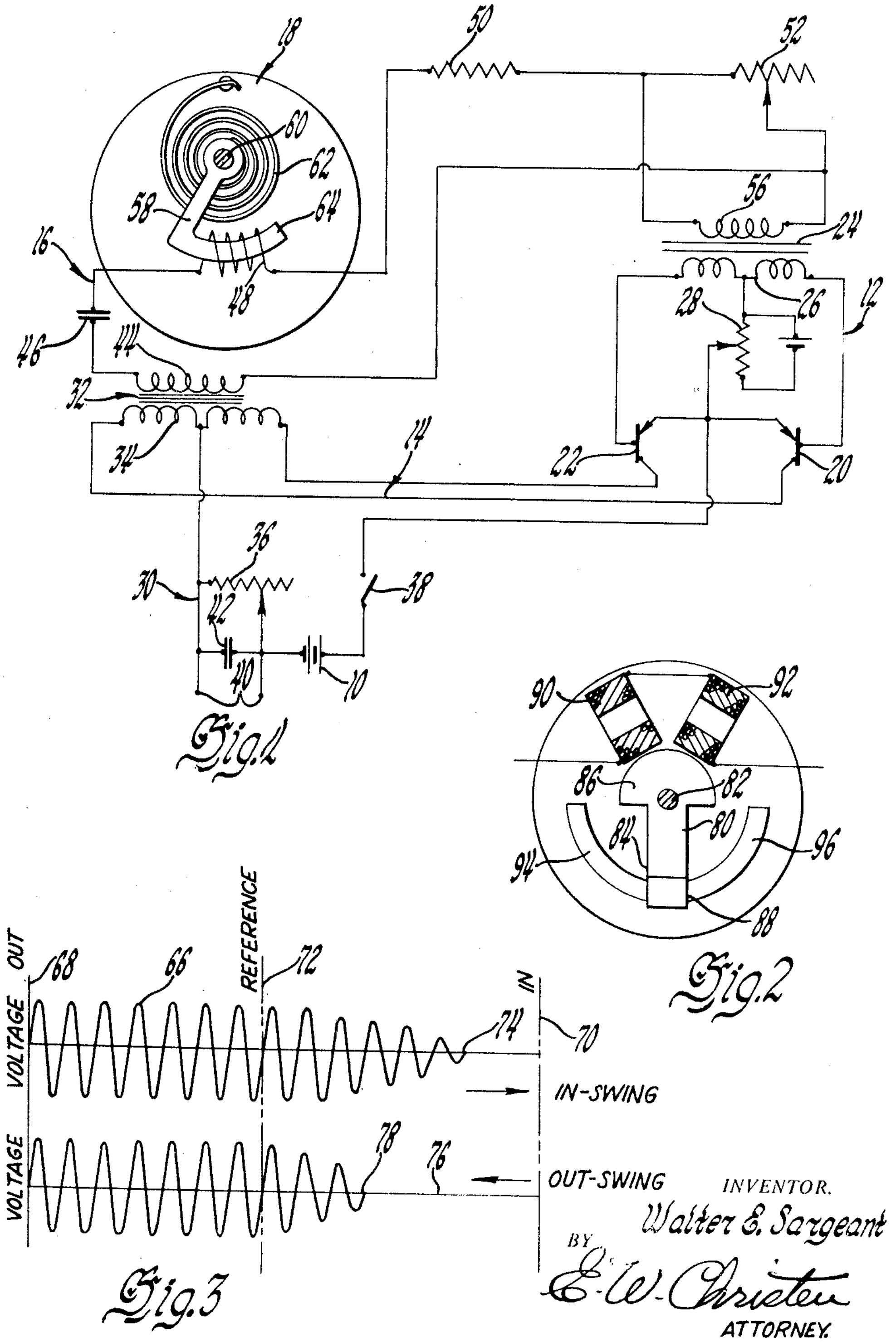
Figure 1 is a schematic circuit diagram of the inventive control circuit.
Figure 2 illustrates a modification of one of the components of the system of Figure 1.
Figure 3 represents wave forms of voltage in the feedback network.

Referring now to the drawings there is shown an illustrative embodiment of the invention in a control circuit especially adapted for developing timing impulses for an automobile clock. In general, the control circuit comprises a feedback oscillator, energized from a direct current source 10, having an input circuit 12 and an output circuit 14 with a feedback network 16. The feedback network includes a torsional pendulum or balance wheel 18 for controlling the recurrence frequency of the timing impulses generated in the output circuit 14.

The feedback oscillator is suitably a push-pull connected transistor oscillator. The transistors 20 and 22 are connected in a common emitter configuration and are provided with input circuits including the feedback transformer 24. The input circuit of the transistor 20 extends from the base electrode to one terminal of secondary winding 26 of the feedback transformer 24 and thence from the center tap through the input bias circuit 28 to the emitter electrode. The input circuit of transistor 22 extends from the base electrode to the other terminal of the secondary winding of the feedback transformer 24 to the center tap and thence through bias circuit 28 to the emitter electrode. The output circuit of the oscillator includes the direct current voltage source or battery 10 for energization, an output impedance network 30, and an output feedback transformer 32. The output circuit of the transistor 20 may be traced from the collector electrode to one terminal of the primary winding 34 of the transformer 32 and thence to the center tap and through the output network 30, including resistor 36 and condenser 42 in parallel, and through the battery 10 and starting switch 38 to the emitter electrode. Similarly, the output circuit of transistor 22 may be traced from the collector electrode to the other terminal of the primary winding 34 to the center tap thereof and thence through the output network 30, battery 10, and switch 38 to the emitter electrode. A pair of output terminals 40 are connected across the output network 30 to derive the output voltage for application to any desired utilization device.

The output circuit also includes the feedback network 16 which is excited from the output transformer 32 through the secondary winding 44. The feedback network includes, in series connection, a condenser 46, inductance coil 48 having an inherent resistance represented by the resistor 50, and the feedback resistor 52. The primary winding 56 of the feedback transformer 24 is connected across a selected portion of the feedback resistor 52 to derive the feedback voltage for application through the transformer to the input circuit 12. The value of the feedback resistance is adjustably selected so that the feedback voltage will sustain oscillations when the torsional pendulum is in one portion of its swing and will prevent oscillations when in another portion, as will appear more fully hereinafter.

In the feedback network 16 the value of reactance of the inductance coil 48 is variable by the influence of the torsional pendulum 18. The pendulum comprises an oscillatory mass 58 mounted on a pivot staff 60 which is suitably journalled for rotation in an associated support structure not shown. A hairspring 62 is connected at its inner end to the pivot staff and at its outer end to a fixed support structure to resiliently constrain displacement of the mass 58 from a reference position. The mass 58 includes a radial arm terminating in an arcuate core 64 aligned with and adapted to extend into the coil 48.

In operation of the inventive control circuit the oscillator is energized from the battery 10 by closure of the switch 38. With the pendulum 18 in its reference position, the core 64 is disposed with respect to coil 48 so that the impedance of the feedback network 16 satisfies the conditions for oscillation i.e., the phase and amplitude of the feedback voltage are such that self-sustained oscillations are generated in the output circuit and the oscillator may be said to be tuned. Accordingly, the oscillations in the output circuit build up in a well known manner by alternate conduction of the transistors 20 and 22 and a pulsating current of the oscillation frequency flows in the output network 30. The feedback voltage, coupled by transformer 32 to the feedback network 16, causes an alternating current of the oscillation frequency to flow through the inductance coil 48. This current flow in the coil causes the core 64 to be attracted toward the coil against the resistance of the hairspring 62. As the core is displaced inwardly of the coil the reactance of the coil increases until a critical value of inductance results at which the impedance of the feedback circuit no longer satisfies the conditions for oscillation and the oscillator may be said to be de-tuned. As a result, the oscillations in the output circuit cease and the alternating current in the feedback network decreases to zero. Thus, the coil no longer exerts a pull on the core and the force of spring 62 overcomes the inertia of the moving core and causes the core to reverse its direction. In the out-swing of the pendulum, the core reaches a position at which the inductance value of the coil is such that the conditions for oscillations are met and pulsating current at the oscillation frequency is caused to flow in the output network 30. The out-swing continues, under the influence of the hairspring, past the reference position to a maximum displacement at which the motion is reversed and the in-swing commences.

It is significant in the operation that the oscillations in the output circuit cease on the in-swing of the pendulum at a core displacement greater than the core displacement at which the oscillations commence on the out-swing of the pendulum. The exact explanation of this behavior is presently unknown; it appears that a time lag exists between the establishment of conditions for oscillation and the occurrence of oscillations. It may be that the feedback impedance required to start oscillations is somewhat different from that required to sustain oscillations. Whatever the explanation, the result is that a net driving force is imparted to the pendulum. This effect arises from the fact that the pull-in force from the longer period of conduction through the coil on the in-swing is greater than the retarding force from the shorter period of conduction on the out-swing.

Consequently, the pendulum oscillation is maintained, at the natural period of the pendulum, by the net driving force from the coil which overcomes the frictional and other losses of the pendulum. This operation is illustrated graphically in Figure 3 which represents typical voltage waveforms across the inductance after steady state conditions have been reached. The abscissa of voltage waveform 66 represents displacement of the core during the in-swing interval. The limits of outward and inward displacement are marked by the position of ordinate axes 68 and 70, respectively, which represent voltage amplitude. The reference position is marked by the ordinate axis 72. For explanatory purposes it may be assumed that the oscillations commence, as represented by waveform 66, at the outer limit 68 of core displacement and continue to exist until after the reference position is passed. At some position 74 the critical value of inductance is realized and the oscillations cease. During the remainder of the in-swing there is no current through the coil. The abscissa of voltage waveform 76 represents displacement of the core during the out-swing. At the inner limit 70 the oscillator is de-tuned and continues to be de-tuned until some position 78 is reached. At this position, oscillations commence to build up and are maintained continuously, in the illustrated operation, throughout the remainder of the out-swing period. It is the positional difference between the cessation of oscillations on the in-swing at position 74 and the initiation of oscillations on the out-swing at position 78 which is effective to deliver a net driving force to maintain the pendulum in oscillation at its natural frequency.

Since the oscillator is in a state of oscillation or tuned during part of the out-swing period and continuously with part of the in-swing period, an output impulse is developed in the output circuit 30 for each cycle of pendulum motion. Thus the impulse recurrence frequency is determined by the natural period of the pendulum and is independent of the oscillation frequency of the oscillator voltage. The output impulse is suitably smoothed or averaged by the condenser 42 and may be applied from terminals 40 to any utilization device such as the coil of a clock or counting device.

A modification of the pendulum structure and coil is illustrated in Figure 2 in which the pendulum is inherently balanced to minimize the disturbance of acceleration forces and the like. In this embodiment the torsional pendulum or balance wheel 80 on pivot staff 82 comprises a radial arm 84 terminating in a counterbalance 86 at one end and supporting a soft iron arcuate core 88 at the other end. The inductance of the feedback network 16 comprises two coils 90 and 92 which are shown in series connection although it will be apparent that a parallel arrangement may be used also. The core portion 94 coacts with the coil 90 during the in-swing and out-swing at one limit of pendulum displacement and the core portion 96 coacts with the coil 92 during the in-swing and out-swing at the other limit of pendulum displacement. Accordingly, the oscillator is tuned and de-tuned during each half-cycle of pendulum motion and the pulse recurrence frequency is twice the natural frequency of the pendulum.

Although the description of this invention has been given with respect to a particular embodiment it is not to be construed in a limiting sense. Many variations and modifications of the invention will now occur to those skilled in the art. For a definition of the invention, reference is made to the appended claims.

I claim:

1. A timing circuit comprising an oscillator having a feedback circuit and an output circuit, the feedback circuit including capacitance and an inductor with a pendulous core adapted to oscillate at its natural frequency, the frequency of said oscillator being greater than the oscillating frequency of said core whereby the oscillator circuit is alternately de-tuned and tuned by the periodic variation of the inductance whereby the oscillator generates an interrupted train of impulses at the oscillator frequency with a recurrence frequency corresponding to said natural frequency, and an output impedance in said output circuit for developing a periodic output voltage corresponding to said natural frequency.

2. A timing circuit comprising an oscillator, an inductance coil in the oscillator upon which the oscillator is dependent for the establishment of oscillatory conditions, a movable core actuable by an oscillatory mass and movable toward and away from said coil for varying the inductance thereof to periodically establsh an oscillatory condition of the oscillator and current in said coil when the core is remote from said coil whereby the core is attracted toward the coil, the inductance of the coil establishing a non-oscillatory condition at one position of the core when it approaches said coil whereby the core reverses direction and establishes an oscillatory condition at a second position when the core withdraws from the coil, the frequency of said oscillator being greater than the oscillating frequency of said mass, said mass being maintained in oscillation at its natural frequency by deriving a net driving force from the core by virtue of the difference of said first and second positions.

3. A timing circuit comprising an oscillator having a feedback circuit and an output circuit, the feedback circuit including an inductance coil, a pendulous core adapted to oscillate coaxially of said coil to vary the inductance of the coil from an oscillation sustaining value in an outward position, the frequency of said oscillator being greater than the oscillating frequency of said core to non-sustaining value in an inward position whereby the output circuit and the coil are excited with oscillations at a recurrence frequency corresponding to the oscillating frequency of the core, said oscillations being sustained to a greater core displacement on the inward swing of the core than the oscillations are initiated on the outward swing of the core whereby the attracting force exceeds the retarding force on the core and the core is maintained in oscillation at its natural frequency.

4. A timing circuit for developing from an oscillator periodic impulses having a recurrence frequency independent of the oscillator frequency comprising an oscillator having a feedback circuit and an output circuit, the feedback circuit including an inductance coil, a torsional pendulum including a core adapted to oscillate coaxially of said coil to vary the inductance thereof from an oscillation sustaining value in an outward position to non-sustaining value in an inward position, the frequency of said oscillator being greater than the oscillating frequency of said pendulum, whereby the output circuit and the coil receive an oscillatory voltage impulse at a recurrence frequency corresponding to the oscillating frequency of the pendulum, the duration of the impulse on the inward swing of the pendulum exceeding the duration of the impulse on the outward swing of the pendulum whereby the core is maintained in oscillation at its natural frequency and the recurrence rate of the output circuit impulses corresponds to said natural frequency.

5. A timing circuit for developing from an oscillator periodic impulses having a recurrence frequency independent of the oscillator frequency comprising an oscillator having a feedback circuit and an output circuit, the feedback circuit including a condenser, resistor, and inductance coil in series connection, a torsional pendulum including a core adapted to oscillate coaxially of the coil to vary the inductance thereof from an oscillation sustaining value in an outward position to a non-sustaining value in an inward position, the frequency of said oscillator being greater than the oscillating frequency of said pendulum, whereby the output circuit and the coil receive an oscillatory voltage impulse at a recurrence frequency corresponding to the oscillating frequency of the pendulum, the duration of the impulse on the inward swing of the pendulum exceeding the duration of the impulse on the outward swing of the pendulum whereby the core is maintained in oscillation at its natural frequency.

6. A timing circuit for developing from an oscillator periodic impulses having a recurrence frequency which is independent of the oscillator frequency comprising a push-pull transistor oscillator having an input circuit, an output circuit and a feedback circuit, the feedback circuit being inductively coupled between the output and input circuits and including an inductance coil, the output circuit including an output impedance for the development of an output impulse, a torsional pendulum including a core adapted to oscillate coaxially of the coil to vary the inductance thereof from an oscillation sustaining value in an outward position to a non-sustaining value in an inward position, the frequency of said oscillator being greater than the oscillating frequency of said pendulum, whereby the output impedance and the coil are excited with an oscillatory voltage impulse at a recurrence frequency corresponding to the oscillating frequency of the pendulum, the duration of the impulse on the inward swing of the pendulum exceeding the duration of the impulse on the outward swing of the pendulum whereby the pendulum is maintained in oscillation at its natural frequency.

7. A timing circuit for developing from an oscillator periodic impulses having a recurrence frequency independent of the oscillator frequency comprising an oscillator having a feedback circuit and an output circuit, the feedback circuit including a pair of inductance coils, a torsional pendulum including a core adapted to oscillate coaxially of said coils to vary the inductance of the coils alternately, the inductance of each coil being variable thereby from an oscillation sustaining value in an outward position to a non-sustaining value in an inward position, the frequency of said oscillator being greater than the oscillating frequency of said pendulum, whereby the output circuit and the coils receive an oscillatory voltage impulse at a recurrence frequency equal to twice the oscillating frequency of the pendulum, the duration of the impulse on the inward swing of the pendulum exceeding the duration of the impulse on the outward swing of the pendulum whereby the pendulum is maintained in oscillation at its own natural frequency.

8. A timing circuit comprising a feedback oscillator including a reactance element, a reactance varying member movable relative to the reactance element through a range of displacement in which the value of reactance tunes the oscillator to generate continuous electrical oscillations and through a range of displacement in which the value of reactance detunes the oscillator to terminate the electrical oscillations, and an oscillatory mass having a natural frequency of mechanical oscillation lower than the frequency of said electrical oscillations, said mass being coupled with the reactance varying member for displacing it through said ranges whereby the oscillator is alternately tuned and detuned and generates a train of electrical oscillations which are interrupted at the natural frequency of the oscillatory mass.

9. A timing circuit comprising a feedback oscillator including an inductance coil, an inductance varying member movable relative to the coil through a range of displacement in which the value of inductance tunes the oscillator to generate continuous electrical oscillations and through a range of displacement in which the value of inductance detunes the oscillator to terminate the electrical oscillations, and an oscillatory mass having a natural frequency of mechanical oscillation lower than the frequency of said electrical oscillations, said mass being coupled with the inductance varying member for displacing it through said ranges whereby the oscillator is alternately tuned and detuned and generates a train of electrical oscillations which are interrupted at the natural frequency of the oscillatory mass.

References Cited in the file of this patent

UNITED STATES PATENTS

| | | |
|---|---|---|
| 2,113,365 | Artzt | Apr. 5, 1938 |
| 2,769,946 | Brailsford | Nov. 6, 1956 |
| 2,777,950 | Doremus | Jan. 15, 1957 |

FOREIGN PATENTS

| | | |
|---|---|---|
| 155,854 | Great Britain | Jan. 6, 1921 |
| 886,065 | France | Oct. 4, 1943 |
| 1,117,873 | France | May 29, 1956 |